(12) United States Patent
Sonoda

(10) Patent No.: US 8,035,712 B2
(45) Date of Patent: Oct. 11, 2011

(54) SOLID-STATE IMAGING APPARATUS, IMAGING SYSTEM, AND METHOD OF DRIVING SOLID-STATE IMAGING APPARATUS

(75) Inventor: Kazuhiro Sonoda, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 412 days.

(21) Appl. No.: 12/390,577

(22) Filed: Feb. 23, 2009

(65) Prior Publication Data

US 2009/0262210 A1 Oct. 22, 2009

(30) Foreign Application Priority Data

Mar. 27, 2008 (JP) ................................. 2008-084108

(51) Int. Cl.
*H04N 5/335* (2011.01)
*H04N 3/14* (2006.01)

(52) U.S. Cl. ........................................ 348/294; 348/303
(58) Field of Classification Search .................. 348/294, 348/300, 301, 302, 303, 307
See application file for complete search history.

(56) References Cited

U.S. PATENT DOCUMENTS

| 2008/0225145 A1 | 9/2008 | Sonoda | 348/294 |
| 2008/0291290 A1 | 11/2008 | Sonoda et al. | 348/222.1 |
| 2009/0244332 A1* | 10/2009 | Sonoda | 348/273 |
| 2009/0256936 A1* | 10/2009 | Sonoda et al. | 348/294 |
| 2009/0256939 A1* | 10/2009 | Sonoda | 348/302 |
| 2009/0262210 A1* | 10/2009 | Sonoda | 348/222.1 |
| 2009/0273697 A1* | 11/2009 | Sonoda | 348/302 |

FOREIGN PATENT DOCUMENTS

JP 2006-025189 A 1/2006

\* cited by examiner

*Primary Examiner* — David N Spector
(74) *Attorney, Agent, or Firm* — Fitzpatrick, Cella, Harper & Scinto

(57) ABSTRACT

If a horizontal skipping operation is performed and operations are performed on the basis of the signals severally held in a plurality of register circuits in a solid-state imaging apparatus including an AD converting circuit in each column to perform the arithmetic processing of a digitized signal, then the AD converters and the register circuits in the columns to be skipped, that is, not to be read out become the state of not participating in the operations, and there is room for an examination in the aspect of the utilization efficiency of the circuits. A unit for connecting a register circuit in a certain column to a register circuit in another column is provided to the solid-state imaging apparatus.

9 Claims, 6 Drawing Sheets

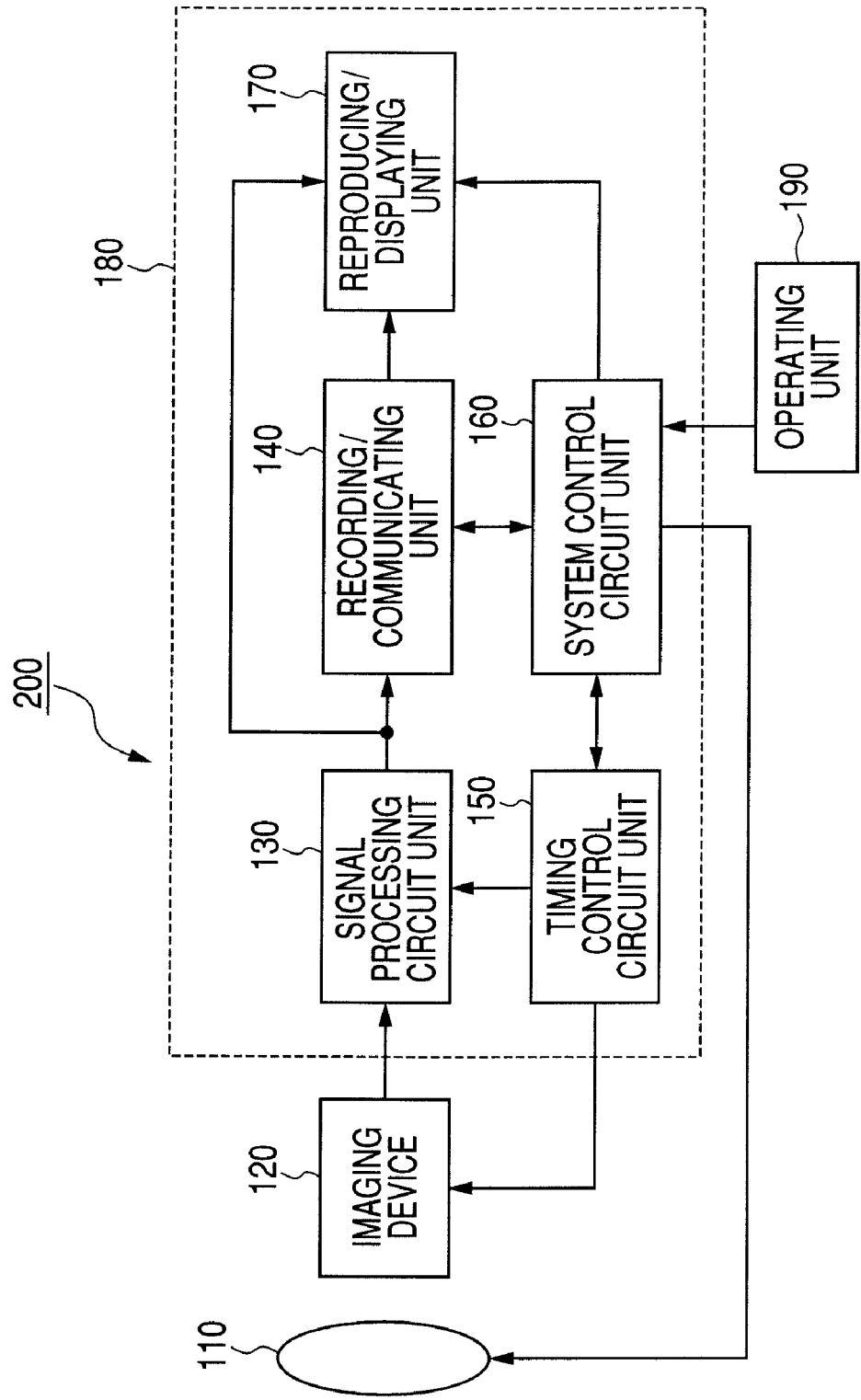

SOLID-STATE IMAGING APPARATUS, IMAGING SYSTEM, AND METHOD OF DRIVING SOLID-STATE IMAGING APPARATUS

BACKGROUND OF THE INVENTION

1. Field of the Invention

The present invention relates to a solid-state imaging apparatus, and more particularly to a solid-state imaging apparatus characterized by including an AD converting circuit in each column to perform arithmetic processing to an obtained plurality of digital signals and a method of driving the solid-state imaging apparatus.

2. Description of the Related Art

The so-called horizontal skipped reading (hereinafter regarded as the same meaning as horizontal skipping operation) has been known in a conventional solid-state imaging apparatus. In the horizontal skipped reading, for example, an analog electric signal, obtained by converting an incident light in each pixel, is read out in every other column of the pixels arranged in a matrix in a use of requiring a high speed operation, such as in a moving image.

Moreover, Japanese Patent Application Laid-Open No. 2006-025189 discloses that an AD converting circuit is provided to each column of pixels, and that a digitized signal is arithmetically processed. To put it concretely, the patent application describes an image sensor provided with two register circuits in each pixel column to store two different signal levels in the same pixel into the register circuits, which image sensor operates the difference between both of the signal levels in a digital region after the storage of the signal levels.

If a horizontal skipping operation is performed and operations are performed on the basis of the signals held in the plurality of respective register circuits in the circuit configuration disclosed in the aforesaid Japanese Patent Application Laid-Open No. 2006-025189, then the AD converters and register circuits in the skipped, that is, not read out, columns become the state of not participating in the operations. This state leaves room for an examination pertaining to the aspect of the utilization efficiency of the circuits.

SUMMARY OF THE INVENTION

An aspect of the present invention is directed to a solid-state imaging apparatus comprising a plurality of pixels arranged in a matrix, each of the pixels converting an incident light into an analog electric signal to output the converted signal; an AD converter provided in each column of the plurality of pixels, the AD converter converting the analog electric signal based on the pixel into a digital signal to output the converted digital signal from an output terminal thereof; a register circuit provided in each of the columns of the plurality of pixels, the register circuit having an input terminal receiving the digital signal output from the output terminal of the AD converter to hold the received digital signal therein; a connecting unit connecting either of the output terminal of the AD converter and an output terminal of the register circuit to an input terminal of another register circuit provided in one of the columns of the plurality of pixels, the column different from the one to which the AD converter is connected, and to an input terminal of a further register circuit provided in one of the columns of the plurality of pixels, the column different from the one to which the former register circuit is connected, respectively; and a control unit including a first driving mode of outputting the analog electric signal only from a part of the plurality of pixels and a second driving mode of outputting the analog electric signal from more pixels than those of the first driving mode.

According to the aspect of the present invention, it is possible to reduce the number of the register circuits that do not participate in any operations to improve the utilization efficiency of the circuits even if a horizontal skipping operation is performed and the operation is performed by using the digital signals held in the plurality of register circuits.

Further features of the present invention will become apparent from the following description of exemplary embodiments with reference to the attached drawings.

BRIEF DESCRIPTION OF THE DRAWINGS

FIG. 6 is a block diagram of an imaging system according to a fourth embodiment of the present invention.

DESCRIPTION OF THE EMBODIMENTS

In the following, exemplary embodiments according to the present invention will be described.

First Embodiment

The circuit configuration of a solid-state imaging apparatus according to an exemplary embodiment of the present invention is first described. The operation will be next described that transfers the digital signal held in the register circuit in a column to be read out to the register circuit in a column not to be read out and performs arithmetic processing to a plurality of digital signals based on the pixels in different rows in the column in a horizontal skipping operation.

Figure 1:
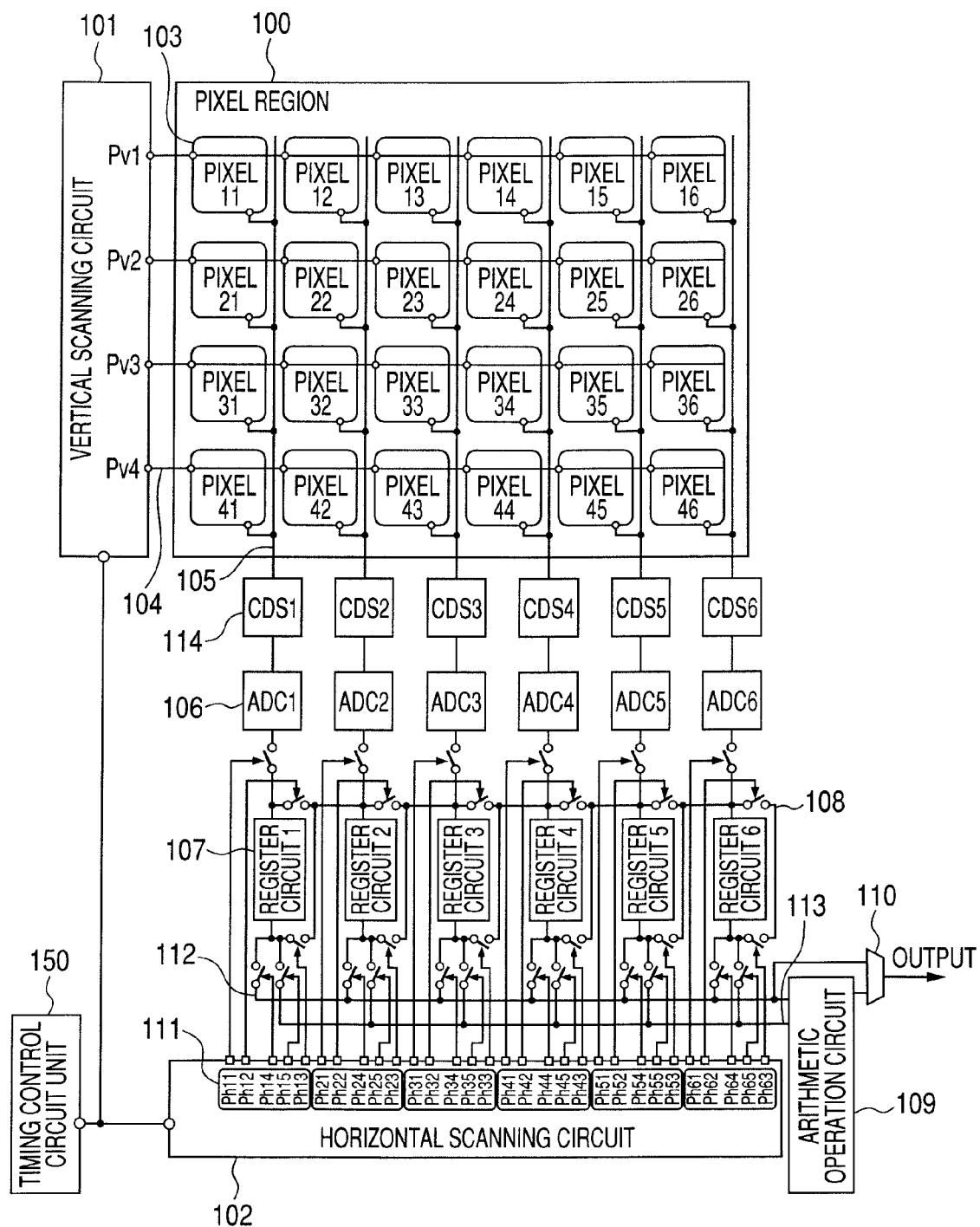
FIG. 1 is a block diagram of a solid-state imaging apparatus according to an exemplary embodiment of the present invention.

FIG. 1 is a block diagram illustrating a solid-state imaging apparatus according to an exemplary embodiment of the present invention. In a pixel region 100, pixels 103 are arranged in a matrix of six pixels in a horizontal direction and four pixels in a vertical direction, and each of the pixels 103 includes a photoelectric conversion element converting an incident light into an electric charge and outputs the converted electric charge as an analog electric signal. The pixels 103 constituting a row are commonly connected to a vertical scanning circuit 101 with a row selecting line 104, and the six pixels 103 connected to a selected row selecting line 104 are selected at the same time. The pixels 103 in the first row to the fourth row are selected in order by setting the row selecting signals Pv1 to Pv4, respectively, to a high level in order. The vertical scanning circuit 101 and a horizontal scanning circuit 102 operate on the basis of the signals generated by a timing control circuit unit 150, which will be described later. The timing control circuit unit 150, which is a control unit, outputs control signals for operating the vertical scanning circuit 101 and the horizontal scanning circuit 102, and can make the pixels 103 output analog electric signals according to the control signals. The timing control circuit unit 150 can output the control signals in various timing, and can drive in different driving modes to control the pixels 103 to output the analog electric signals, where the pixels 103 outputting the analog signals are different in different modes.

The analog electric signal output from each of the pixels 103 selected by one of the row selecting lines 104 is input into a correlated double sampling (CDS) circuit 114, which is provided to each of the columns, through each of corresponding vertical output lines 105, to which the pixels 103 in the corresponding column are connected in common. Each of the CDS circuits 114 performs difference processing between the level of the noise included in an analog electric signal and the level of the signal to perform noise cancelling. Although the vertical output lines 105 are directly connected to the CDS circuits 114 severally in FIG. 1, amplifiers for amplifying the analog electric signals from the pixels 103 may be connected between the pixel region 100 and the CDS circuits 114 to reduce the influences of the noise components superimposed on the analog electric signals. The analog electric signal of each column that has been subjected to the noise cancelling is input into an AD converter (ADC) 106 provided to each column. The analog electric signal input into the ADC 106 is converted into a digital signal. The converted digital signal is output from the output terminal of the AD converter 106, and a register circuit 107 provided to each column of the pixels 103 receives the input digital signal at the input terminal thereof to hold the digital signal therein.

The digital signal held in the register circuit 107 is output from the output terminal of the register circuit 107 to a horizontal output line 112 by the suitable selection of the register circuit 107 by the horizontal scanning circuit 102. For example, when the horizontal scanning circuit 102 transits column selecting signals Ph14, Ph24, . . . to the high level in that order, the digital signal held in each of the register circuits 107 is output to the horizontal output line 112 in the order of from a register circuit 1 to a register circuit 6 among the register circuits 107. The digital signals output to the horizontal output line 112 are output from the solid-state imaging apparatus through a selector 110.

Moreover, the horizontal scanning circuit 102 makes each of the register circuits 1 to 6 output the digital signal held in each of them to a horizontal output line 113 in order by transiting column selecting signals Ph15, Ph25, . . . to the high level in that order. When the digital signals are simultaneously output to the horizontal output lines 112 and 113, an arithmetic operation circuit 109, to which the horizontal output lines 112 and 113 are connected in parallel with each other, performs arithmetic processing, such as addition, subtraction, and averaging, to the digital signals from both the horizontal output lines 112 and 113, and the arithmetic operation circuit 109 outputs the operation result from the solid-state imaging apparatus through the selector 110. Although the configuration uses two horizontal output lines 112 and 113 connected to the arithmetic operation circuit 109 here, the configuration of connecting three or more horizontal output lines to the arithmetic operation circuit 109, that is, the configuration of performing the arithmetic processing to the digital signals from the three or more horizontal output lines may be adopted.

In the present embodiment, the selector 110 selects and outputs a signal between the signal obtained by performing the arithmetic processing to the two digital signals severally read out to the horizontal output lines 112 and 113 and the digital signal read out to the horizontal output line 112 and not subjected to any arithmetic processing.

Although the present embodiment divides the six pixel columns in a horizontal direction into two blocks, each composed of three pixel columns, the effect of the present invention does not change even if the number of pixel columns per block is increased, or if the six pixel columns are divided into three or more blocks.

Figure 2:
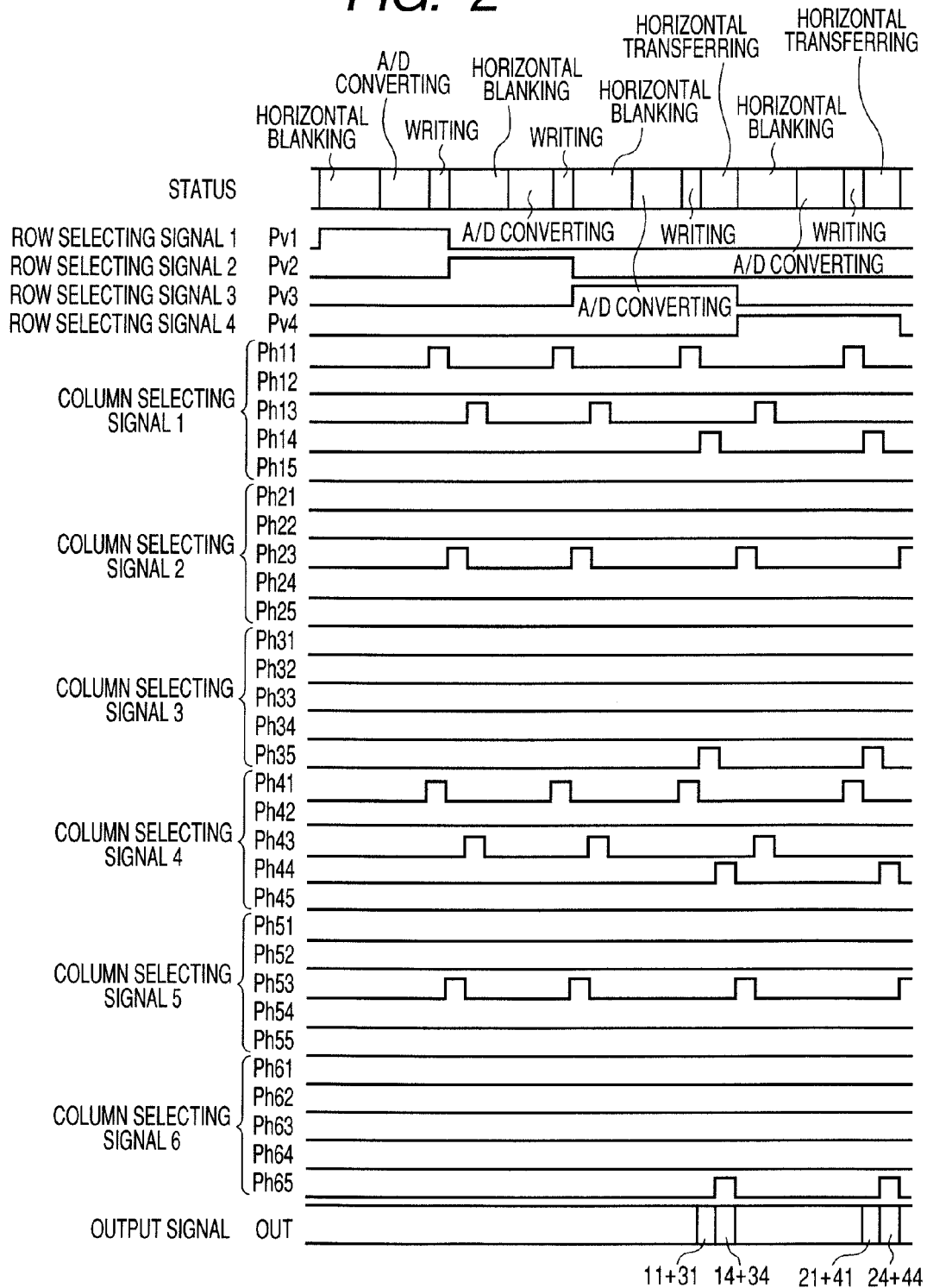
FIG. 2 is a timing chart illustrating a method of driving a solid-state imaging apparatus according to a first embodiment of the present invention.

The timing chart illustrated in FIG. 2 illustrates an operation corresponding to a first driving mode of adding the signals of two pixels in the same column while performing a horizontal skipping operation in the solid-state imaging apparatus illustrated in FIG. 1. Such a driving method can be suitably used for, for example, the use of obtaining continuously images at a high frame rate, such as a moving image. Moreover, the ratio of the pixels to be used as the signals for forming an image to the whole pixel 103, that is, a skipping ratio, can be made to be variable. Consequently, it is conceivable that, when an image is obtained in a particularly high frame rate, the solid-state imaging apparatus takes the first driving mode, by which the ratio of the pixels to be used is made to be low, and that, when the speeding-up of the frame rate is not required so much, the solid-state imaging apparatus takes a second driving mode, by which the ratio of the pixels to be used is made to be high. In the following, a description will be given on the basis of FIG. 2. As an initial state, the data written in the register circuits 1 to 6 is set to be 0.

The description is given here by focusing on the pixel column including a pixel 11 to a pixel 41. The row selecting signal Pv1 is first transits to the high level, and the operation in a read out period of the first row is started. In horizontal blanking of the status of the solid-state imaging apparatus, an analog electric signal is output from the pixel 11 to the corresponding vertical output line 105, and a CDS circuit 1 among the CDS circuits 114 performs the noise cancelling of the analog electric signal. An ADC 1 among the ADCs 106 performs the AD converting of the signal subjected to the noise cancelling in an A/D conversion status, and is output from the ADC 1 as a digital signal. In a write status, a column selecting signal Ph11 transits to the high level, and thereby the ADC 1 is connected to the register circuit 1. Thus the digital signal is written in the register circuit 1.

Successively, a row selecting signal Pv2 transits to the high level as the row selecting signal Pv1 transits to the low level, and the read out operation of the pixels in a second row is started. In the horizontal blanking status of the second row, a transfer operation from the register circuit 1 to a register circuit 2 is performed in parallel with the read out of the pixels in the second row. A column selecting signal Ph23 first transits to the high level, and the digital signal (0 here) held in the register circuit 2 is transferred to a register circuit 3. A column selecting signal Ph13 next transits to the high level, and the digital signal based on the pixel 11, which digital signal has been held in the register circuit 1, is transferred to the register circuit 2.

The analog electric signal from a pixel 21, which has been subjected to the noise cancelling by the CDS circuit 1 in the horizontal blanking status, is converted into a digital signal in the A/D conversion status, following which the converted digital signal is written in the register circuit 1 by the transition of the column selecting signal Ph11 to the high level in the subsequent write status. Then the writing into the register circuit 1 ends, and the row selecting signal Pv2 transits to the low level. Thus the operation of the second row ends.

The operation of a third row is started by the transition of a row selecting signal Pv3 to the high level, and the digital signal held in the register circuit 2 in the horizontal blanking status, that is, the digital signal based on the pixel 11, is transferred to the register circuit 3. After that, the digital signal held in the register circuit 1 by the transition of the column selecting signal Ph13 to the high level, that is, the digital signal based on the pixel 21, is transferred to the register circuit 2. In the horizontal blanking status of the third row, the analog electric signal from a pixel 31 is similarly read out to a corresponding vertical output line 105, and the CDS circuit 1 performs the noise cancelling of the read analog electric signal. The analog electric signal subjected to the noise cancelling is converted to a digital signal in the A/D conversion status by the ADC 1 and is output to be written in the register circuit 1 in the write status.

In the subsequent horizontal transfer status, column selecting signals Ph14 and Ph35 simultaneously transit to the high level, and the signals held in the register circuits 1 and 3, that is, the digital signals based on the pixels 31 and 11, are output to the horizontal output lines 112 and 113, respectively. The two digital signals input into the arithmetic operation circuit 109 in parallel with each other are added together in the arithmetic operation circuit 109, and the added signal is output from the solid-state imaging apparatus through the selector 110. The output signal in FIG. 2 schematically expresses the signals output from the selector 110, and, for example, 11+31 indicates that a signal generated by adding the digital signals based on the pixels 11 and 31 together is output.

The similar operations to that for the third row are repeated in the operations on and after a fourth row, and the digital signals based on the pixels on every other row in the same column are added together to be output. Such addition on every other row can be used in the case of adding the signals from the same color pixels in the case where a color filter having a 2×2 repetition unit, such as a Bayer color array, is provided in a pixel region.

The above-mentioned description has been given, focusing on the three columns on the left side among six pixels in a horizontal direction. The operations for the three columns on the right side are also performed in the same timing as that of the operations for the block on the left side except that the timing of outputting the digital signals held in register circuits 4 and 6 to the horizontal output lines 112 and 113, respectively, in the horizontal transfer status differs from that on the left side. Although the addition operation is described above as an example, the operations executed in the arithmetic operation circuit 109 may be averaging processing or difference processing.

Figure 3:
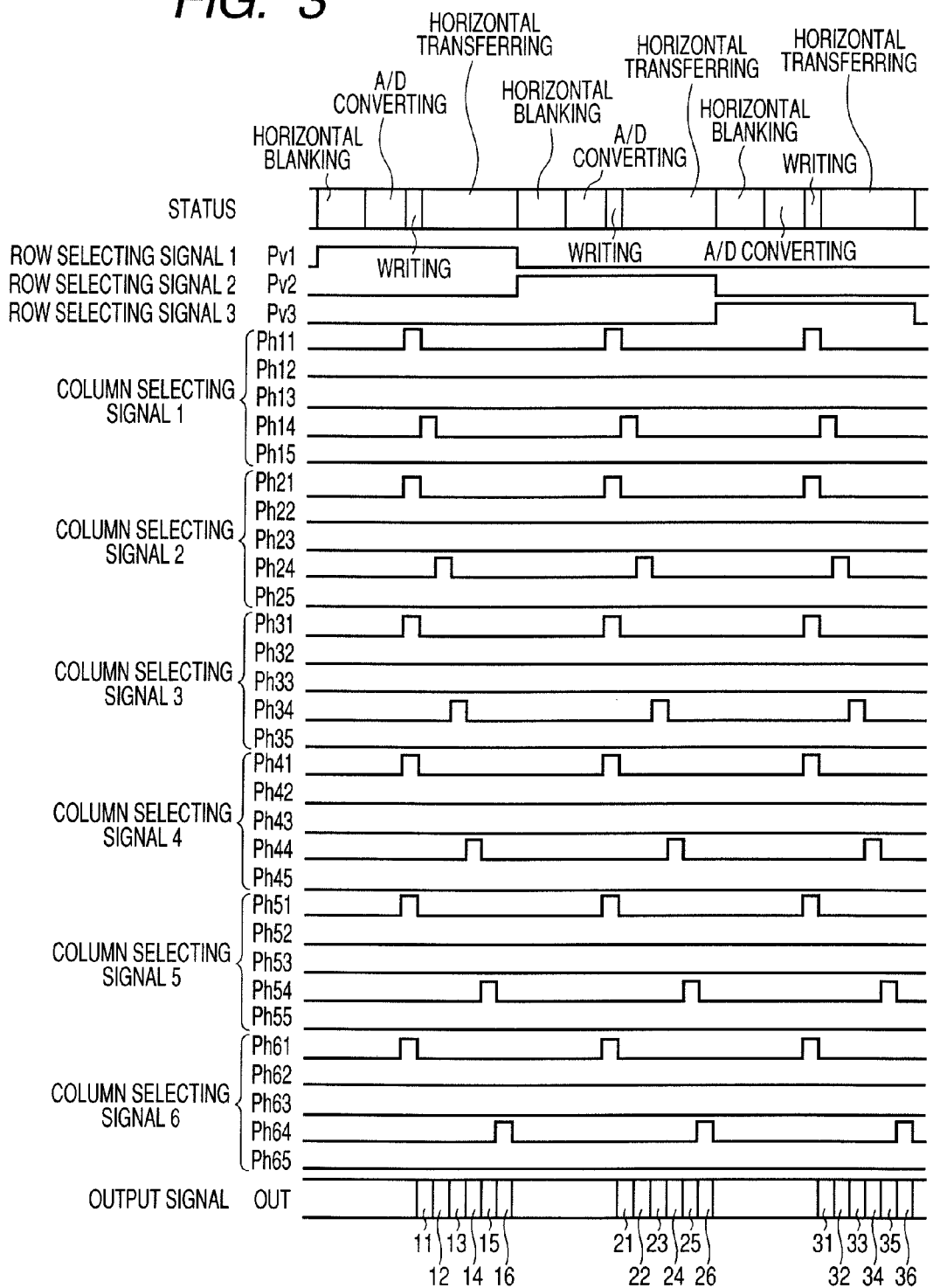
FIG. 3 is another timing chart illustrating the method of driving the solid-state imaging apparatus according to the first embodiment of the present invention.

Next, an operation corresponding to the second driving mode of performing output without any skipping and addition in the method of driving the solid-state imaging apparatus illustrated in FIG. 1 will be described with reference to FIG. 3. The second driving method is a driving method to be performed in the case where a high resolution is required in the photographing of a still image or the like.

A horizontal transfer operation is performed during a read out period of each row in the present driving method of reading out the signals from all of the pixels 103. First, in the horizontal blanking and A/D conversion statuses in the first row, the analog electric signals from the pixels 11-16 in the first row are subjected to the noise cancelling in the CDSs 114, and the analog electric signals are output from the ADCs 106 as digital signals subjected to the noise cancelling.

The column selecting signals Ph11, Ph21, . . . are simultaneously transit to the high level in the next write status, and the digital signals output from the ADCs 106 in the respective columns are held in the register circuits 107 in the respective columns.

The column selecting signals Ph14, Ph24, . . . transit to the high level in order in the subsequent horizontal transfer status, and the digital signals held in the respective register circuits 107 are sequentially output to the horizontal output line 112. The digital signals output to the horizontal output line 112 are output to the outside of the solid-state imaging apparatus through the selector 110.

Similar operations are performed on and after the second row, and the signals of all of the pixels 103 can be sequentially output in the solid-state imaging apparatus illustrated in FIG. 1.

The exemplary embodiment of the present invention described above includes a connecting unit for connecting the output terminal of a register circuit and the input terminal of another register circuit provided in a pixel column different from those of the former register circuit. Consequently, the number of the registers that are not involved in a horizontal skipping and addition operation can be reduced in comparison with that of the registers of the conventional method when the horizontal skipping and addition operation is performed, and the utilization efficiency of the circuit can be improved. Incidentally, the connecting unit in the present embodiment indicates a route that conducts as for an $n^{th}$ pixel in FIG. 1 when a column selecting signal Phn3 transits to the high level. Moreover, by performing the drive illustrated in FIG. 3, the signals in all of the pixels 103 of the solid-state imaging apparatus illustrated in FIG. 1 can be read out. Then, according to the present embodiment, the timing control circuit unit 150 includes the first driving mode of outputting analog electric signals only from a part of the pixels 103 and the second driving mode of outputting analog electric signals from more pixels 103 than those in the first driving mode. Hereby, for example, in the use of obtaining an image in a high frame rate, the register circuits in the columns corresponding to the pixels from which no signals are read out can be effectively used, and switching for obtaining a high resolution image can be performed.

Second Embodiment

The horizontal skipping operation is not limited to that of the first embodiment. Another driving method of the horizontal skipping operation will be described here.

The solid-state imaging apparatus is generally known that reads out the signal based on the electric charge obtained by a photoelectric conversion in the first accumulation time and the signal based on the electric charge by a photoelectric conversion in the second accumulation time and performs arithmetic processing, such as amplification and addition, to these signals to expand the dynamic range of the apparatus. The first accumulation time and the second accumulation time differ from each other, and the signals based on the respective accumulation times are generally read out in different timing. Here a description will be given to the driving method of transferring the digital signal held in the register circuit in a pixel column to be read out to the register circuit in a column not to be read out in a horizontal skipping operation and of performing the arithmetic processing of a plurality of signals obtained from the same pixel.

Figure 4:
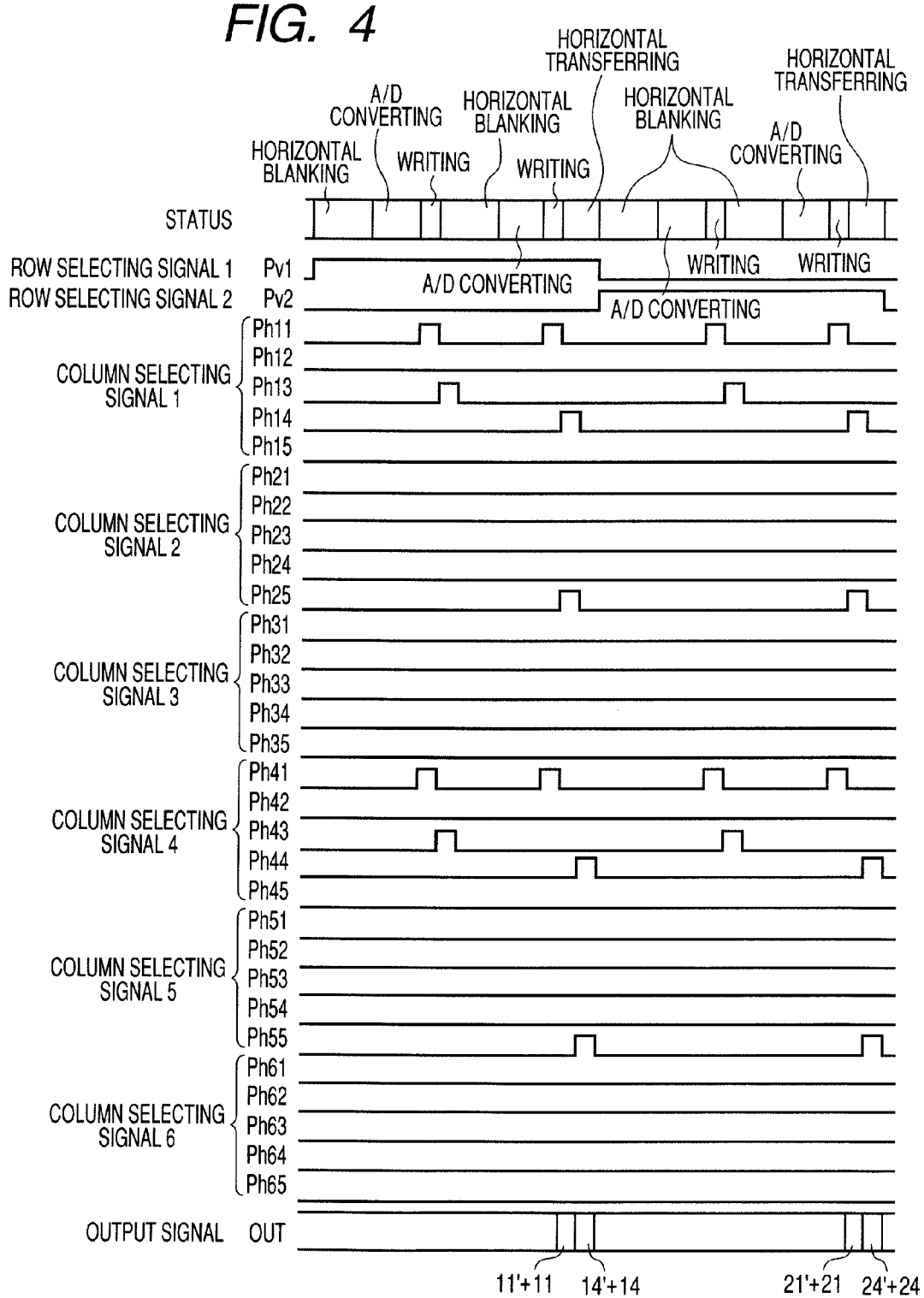
FIG. 4 is a timing chart illustrating a method of driving a solid-state imaging apparatus according to another embodiment of the present invention.

The timing chart illustrated in FIG. 4 illustrates the driving method of the other embodiment of the present invention, and illustrates the horizontal skipping operation of not reading out the pixels in the second, third, fifth and sixth columns of the pixels 103 composed of six pixels in a horizontal direction and four pixels in a vertical direction. The two different signals obtained by reading out the pixels in the first and fourth columns to be read out twice per pixel are arithmetically processed to be output to the outside of the solid-state imaging apparatus.

The pixels 103 in the first row are selected during a period in which the row selecting signal Pv1 takes the high level in FIG. 4. In the first horizontal blanking status of the first row, the electric charges obtained by the photoelectric conversions of the pixels in the first row in the first accumulation time are converted into analog electric signals to be read out to the respective vertical output lines 105. The read out analog electric signals are converted into digital signals in the subsequent first A/D conversion status. The digital signals are held in the register circuit 1 in the first write status.

Next, in the second horizontal blanking status, the analog electric signals that have not been read out in the first horizontal blanking status, that is, the analog electric signals based on the electric charges obtained by the photoelectric conversions in the second accumulation time, are read out to the respective vertical output lines 105. The column selecting signal Ph13 transits to the high level in parallel with the read out, and the digital signals held in the register circuit 1 in the first write status are transferred to the register circuit 2. The analog electric signals read out in the second horizontal blanking status are converted into digital signals in the subsequent second A/D conversion status, and are held in the register circuit 1 in the second write status.

The digital signals held in the register circuits 1 and 2 are output to the horizontal output lines 112 and 113, respectively, in the horizontal transfer status, and the arithmetic operation circuit 109 performs the arithmetic processing, such as addition and amplification, to the digital signals, to generate a pixel signal having a wide dynamic range. In the output signal in FIG. 4, for example, 11' in 11'+11 indicates the signal based on an electric charge by the photoelectric conversion in the first accumulation time, and 11 in 11'+11 indicates the signal based on the electric charge by the photoelectric conversion in the second accumulation time.

By performing the operation similar to the operation described above on and after the second row, an image having a wide dynamic range can be obtained.

The embodiment of the present invention described above includes a connecting unit for connecting the output terminal of a register circuit and the input terminal of a register circuit provided in a pixel column different from the column of the former register circuit. Hereby, in the case of obtaining an image having a wide dynamic range while performing a horizontal skipping operation, the number of the register circuits that are not involved in the operation can be reduced in comparison with the conventional method, and the utilization efficiency of the circuits can be improved. Incidentally, the connecting unit in the present embodiment indicates the route mutually connecting different register circuits at the time of the transition of the column selecting signal Phn3 to the high level as for the pixels 103 in the $n^{th}$ column in FIG. 1.

For example, it is possible to perform the above-described operation on the basis of the control signals output from the timing control circuit unit 150 as the first driving mode, and to perform the operation of outputting analog electric signals from more pixels as the second driving mode. Hereby, for example, in the use of obtaining an image at a high frame rate, the registers corresponding to the columns including the pixels from which no signals are read out can be effectively used, and switching can be performed so as to obtain a high resolution image.

Third Embodiment

A further driving method of horizontal skipping operation according to the present invention will be described with reference to FIG. 5. In the present embodiment, in a horizontal skipping operation, the digital signal based on a light blocking pixel in a pixel column to be read out is held in a register circuit in a pixel column not to be read out, and the difference signal between the signal held by the register circuit in a pixel column not to be read out and the digital signal based on an effective pixel held in the register circuit in a pixel column to be read out is output. To put it concretely, the description is given by focusing on the pixel column in the first column on the supposition that the pixels in the first row, which are selected by the row selecting signal Pv1, are light shielded pixels (optical black pixels: OB pixels) outputting analog electric signals independent of light quantities, and the supposition that only the pixel columns in odd columns are read out.

Figure 5:
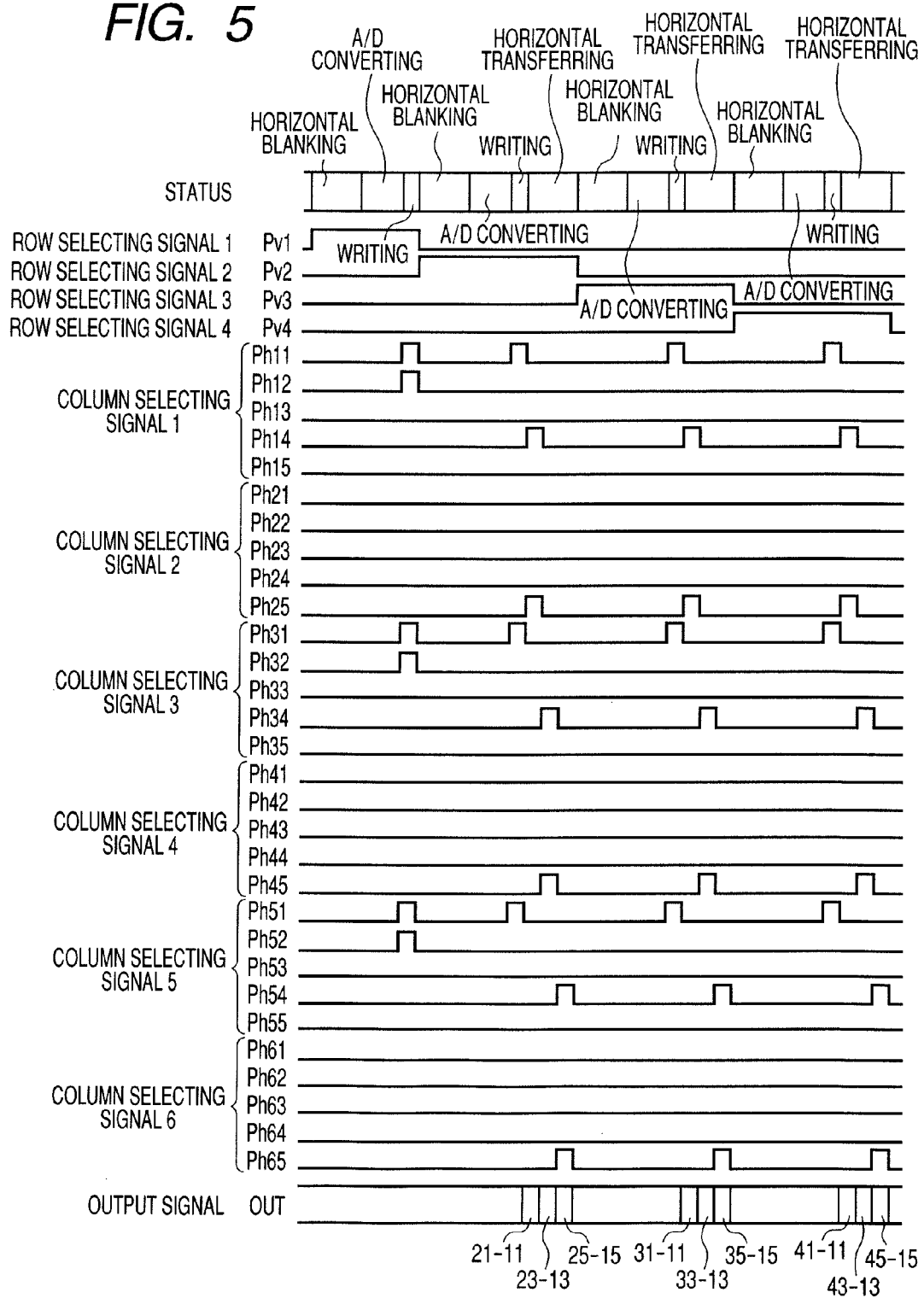
FIG. 5 is a timing chart illustrating a method of driving a solid-state imaging apparatus according to a third embodiment of the present invention.

In FIG. 5, an analog electric signal is read out from the pixel 11, which is an OB pixel, in the horizontal blanking status of the first row similarly to the embodiments described above, and the read out analog electric signal is subjected to the noise cancelling thereof in the CDS circuit 1. The analog electric signal is converted into a digital signal in the subsequent A/D conversion status, and the converted digital signal is held in the register circuits 1 and 2 in the write status by the transitions of the column selecting signals Ph11 and Ph12 to the high level.

In the selection period of the second row, in which the row selecting signal Pv2 transits to the high level, the analog electric signal based on the pixel 21 is subjected to the noise cancelling thereof in the horizontal blanking status and is converted into a digital signal in the A/D conversion status. In the write status, the column selecting signal Ph11 transits to the high level, and the digital signal based on the pixel 21, which is an effective pixel, is held in the register circuit 1.

In the horizontal transfer status, column selecting signals Ph14 and Ph25 transit to the high level at the same time, the digital signal based on the pixel 21 is output to the horizontal output line 112, and the digital signal based on the pixel 11, which is the OB pixel, is output to the horizontal output line 113. These digital signals are input into the arithmetic operation circuit 109, and the signal subjected to the arithmetic processing including the subtraction processing of subtracting the digital signal based on the OB pixel from the digital signal based on the pixel 21 is output from the solid-state imaging apparatus through the selector 110.

Also on and after the third row, the operation is repeated by which the digital signal based on an effective pixel is held in the register circuit 1 in the write status and the difference operation of the digital signal and the digital signal based on the OB pixel is performed in the horizontal transfer status.

The embodiment of the present invention described above includes a connecting unit for connecting the output terminal of an AD converter and the input terminal of a register circuit provided in a column of the pixels different from those of the column of the AD converter. Hereby, the number of the registers that do not participate in a horizontal skipping operation and correction processing using an OB pixel can be reduced in comparison with that of the conventional method when the horizontal skipping operation and the correction processing are performed, and consequently the utilization efficiency of the circuits can be improved. The connecting unit in the present embodiment indicates a route that conducts when column selecting signals Ph12, Ph22, . . . transit to the high level.

Incidentally, the configuration including the selector 110 is illustrated in each of the embodiments described above, but the selector 110 may be omitted by configuring the arithmetic operation circuit 109 so as to output a signal without performing any arithmetic processing, for example, in the case where the signal is output to only either of the horizontal output lines 112 and 113.

It is possible to perform, for example, the operation described above as the first driving mode, and the operation of outputting analog electric signals from more pixels as the second driving mode on the basis of the control signals output from the timing control circuit unit 150. Hereby, for example, in the use of obtaining an image at a high frame rate, the register of a column from which no signals are read out can be effectively used, and the switching can be performed so as to obtain a high resolution image.

Fourth Embodiment

The schematic configuration and the schematic operation of an imaging system 200 according to a fourth embodiment of the present invention will be described with reference to FIG. 6. FIG. 6 is a configuration diagram of the imaging system 200 according to the present embodiment.

The imaging system 200 includes an optical system 110, a solid-state imaging apparatus 120, and a signal processing unit 180. The signal processing unit 180 includes a signal processing circuit unit 130, a recording/communicating unit 140, the timing control circuit unit 150, a system control circuit unit 160, and a reproducing/displaying unit 170.

The optical system 110 forms an image of a subject on a pixel arrangement, which is an imaging surface of the solid-state imaging apparatus 120.

The solid-state imaging apparatus 120 is, for example, the solid-state imaging apparatus according to the first embodiment. The solid-state imaging apparatus 120 converts the image of a subject formed on the pixel arrangement into an image signal. The solid-state imaging apparatus 120 reads out the image signal from the pixel arrangement to output the read out image signal to the signal processing circuit unit 130.

The signal processing circuit unit 130 performs the signal processing, such as the compression processing of the image data, to the image signal supplied from the solid-state imaging apparatus 120 in accordance with a previously determined method. The signal processing circuit unit 130 supplies the image data subjected to the signal processing to the recording/communicating unit 140 and the reproducing/displaying unit 170.

The recording/communicating unit 140 sometimes records the image data supplied from the signal processing circuit unit 130 into a not illustrated recording medium, and sometimes transmits the image data to a similarly not illustrated external apparatus. Alternatively, the recording/communicating unit 140 sometimes reads out image data from the recording medium to supply the read out image data to the reproducing/displaying unit 170, and sometimes receives a predetermined instruction from a not illustrated input unit to supply the received instruction to the system control circuit unit 160.

The reproducing/displaying unit 170 displays the image data supplied from the signal processing circuit unit 130 or the recording/communicating unit 140 on a display device.

The timing control circuit unit 150, which is a control unit, supplies a control signal for controlling the timing of driving the solid-state imaging apparatus 120 and has the role as a mode switching unit. The timing control circuit unit 15, for example, supplies a signal for performing a horizontal skipping operation as the first driving mode sometimes, and supplies a signal for reading out signals from more pixels as the second driving mode sometimes.

The system control circuit unit 160 receives predetermined instruction information from the recording/communicating unit 140. The system control circuit unit 160 controls the optical system 110, the recording/communicating unit 140, the reproducing/displaying unit 170, and the timing control circuit unit 150 in accordance to a predetermined instruction. The system control circuit unit 160, for example, controls the optical system 110, the recording/communicating unit 140, the reproducing/displaying unit 170, and the timing control circuit unit 150 according to each of an entire pixel reading out mode and a skipping reading out mode.

An operating unit 190 is, for example, switches that a user operates or the like, and a signal in accordance with an operation of the user is supplied to the system control circuit unit 160. When the system control circuit unit 160 receives a signal from the operating unit 190, the system control circuit unit 160 determines, for example, in which driving mode the system control circuit unit 160 drives the imaging system 200 including the imaging device 120 in conformity with a previously stored program. Then, the system control circuit unit 160 outputs signals to the timing control circuit unit 150, the recording/communicating unit 140, and the reproducing/displaying unit 170 so as to perform the operations corresponding to the determined driving mode. When the timing control circuit unit 150 receives the signals, the timing control circuit unit 150 outputs the control signals for performing the operations described with regard to each of the embodiments described above.

According to the present embodiment, it is possible to hold the digital signals in the register circuits provided in the columns including the pixels from which no signals are read out in the time of a skipping operation. Therefore, in the case of performing a horizontal skipping operation, the number of the register circuits that are not involved in the operation can be reduced, and the arithmetic processing, such as addition, averaging, and subtraction (difference), can be realized with the utilization efficiency of the circuits improved.

The configuration in which the solid-state imaging apparatus includes the arithmetic operation circuit 109 and the selector 110 therein has been given in every embodiment described above, but the arithmetic operation circuit 109 and the selector 110 are not always provided in the solid-state imaging apparatus 120. For example, in FIG. 6, the arithmetic operation circuit 109 and the selector 110 may be provided in the signal processing circuit unit 130. In this case, the area of the semiconductor substrate of the solid-state imaging apparatus 120 can be reduced, and then the effect described above can be obtained. One of the important respects of the present invention is that the present invention has the configuration capable of holding a digital signal in a register circuit provided in a column including pixels from which no signals are read out in the case of performing a horizontal skipping operation. Another important respect of the present invention is that the present invention has the configuration capable of performing an operation as the first driving mode and an operation as the second driving mode according to control signals output from the timing control circuit unit 150. For example, in the use of obtaining an image at a high frame rate, it is possible to effectively use the register in the column corresponding to the pixels from which no signals are read out by the first driving mode, and to switch the driving mode to the second driving mode capable of obtaining a high resolution image. In particular, it is possible to obtain a moving image by the first driving mode and a still image by the second driving mode.

Now, the AD converter in a column including the pixels from which no signals are read out does not participate in any operations. Consequently, the reduction of power consumption can be attained by turning off the electric power supplied to the AD converter in the column including the pixels from which no signals are read out in a horizontal skipping operation. For example, it is conceivable to provide a switch between a power supply line through which electric power is supplied and the AD converter to turn off the switch when no signals are read out from the pixels in the column. Moreover, if the level of the electric power to be supplied to each AD converter can be individually set, then the level of the electric power supplied from the power source of the column including the pixels from which no signals are read out can be lowered. In other words, it is important to set the power consumption of the AD converter provided in a column including the pixels from which no signals are read out to be less than that of the AD converter provided in a column including the pixels from which signals are read out.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-084108, filed Mar. 27, 2008, which is hereby incorporated by reference herein in its entirety.

What is claimed is:

1. A solid-state imaging apparatus comprising:
a plurality of pixels arranged in a matrix, wherein each of the pixels converts an incident light into an analog electric signal;
A/D converters each arranged corresponding to each column of the plurality of pixels, for converting the analog electric signal from the pixel into a digital signal, and for outputting the digital signal from an output terminal of the A/D converter;
register circuits each arranged corresponding to each column of the plurality of pixels, for receiving by an input terminal thereof the digital signal output from the output terminal of the A/D converter, and for holding the digital signal received; and
a connecting unit for connecting the output terminal of the A/D converter arranged correspondingly to one column of the pixels to the input terminal of the register circuit arranged correspondingly to the other column of the pixels different from a column of the pixel correspondingly to which the A/D converter is arranged, or for connecting the output terminal of the register circuit arranged correspondingly to one column of the pixels to the input terminal of the register circuit arranged correspondingly to the other column of the pixels different from the column of the pixels correspondingly to which the register circuit, wherein the solid-state imaging apparatus further comprises
a controlling unit for controlling in a first driving mode for outputting the analog electric signal only from a part of the plurality of pixels, and for controlling in a second driving mode for outputting the analog electric signal from larger number of the pixels than in the first driving mode.

2. The solid-state imaging apparatus according to claim 1, wherein
the digital signal held by each of the plurality of register circuits is a digital signal based on the analog electric signals from the same column of the pixels.

3. A driving method of a solid-state imaging apparatus according to claim 1, wherein
a frame rate of outputting the analog electric signal from the pixels in the first driving mode is higher than a frame rate of outputting the analog electric signal from the pixels in the second driving mode.

4. The solid-state imaging apparatus according to claim 1, further comprising
an arithmetic operation unit for arithmetically processing the digital signal output in parallel from each of the output terminals of the plurality of register circuits and for outputting the processed digital signal.

5. The solid-state imaging apparatus according to claim 4, wherein
the arithmetic processing includes at least one of addition, subtraction and averaging.

6. A driving method of a solid-state imaging apparatus according to claim 1, comprising
a horizontal skipped reading; and
a step of transferring the digital signal based on the analog electric signal from the pixels in a column to be readout to the register arranged correspondingly to the column of the pixels not to be readout, during the horizontal skipped reading.

7. The driving method of a solid-state imaging apparatus according to claim 6, wherein
a power supply for the A/D converter arranged correspondingly to the column of the pixels not to be readout is turned off.

8. An imaging system comprising:
a solid-state imaging apparatus according to claim 1;
an optical system for forming an image on the plurality of pixels; and
a signal processing unit for processing a signal outputted from the solid-state imaging apparatus.

9. A method of driving an imaging system according to claim 8 comprising steps of:
taking a moving image in the first driving mode; and
taking a still image in the second driving mode.

* * * * *